(12) United States Patent
Lee

(10) Patent No.: US 6,198,638 B1
(45) Date of Patent: Mar. 6, 2001

(54) SYNCHRONOUS RECTIFIER FLYBACK CIRCUIT FOR ZERO VOLTAGE SWITCHING

(75) Inventor: Sang Yun Lee, Suwon (KR)

(73) Assignee: Samsung Electro-Mechanics Co., Ltd., Kyungki-do (KR)

(*) Notice: Subject to any disclaimer, the term of this patent is extended or adjusted under 35 U.S.C. 154(b) by 0 days.

(21) Appl. No.: 09/489,803

(22) Filed: Jan. 24, 2000

(30) Foreign Application Priority Data

Jan. 25, 1999 (KR) .................................... 1999-2291

(51) Int. Cl.[7] .................................................. H02M 3/335
(52) U.S. Cl. .................................................. 363/20; 363/21
(58) Field of Search .................................. 363/16, 20, 21, 363/95, 97, 125, 127, 131

(56) References Cited

U.S. PATENT DOCUMENTS

| | | | |
|---|---|---|---|
| 4,922,404 | * 5/1990 | Ludwig et al. | 363/89 |
| 5,828,558 | * 10/1998 | Korcharz et al. | 363/20 |
| 5,986,895 | * 11/1999 | Stewart et al. | 363/16 |
| 6,101,104 | * 8/2000 | Eng | 363/21 |

* cited by examiner

*Primary Examiner*—Matthew Nguyen
(74) *Attorney, Agent, or Firm*—Darby & Darby

(57) ABSTRACT

The present invention relates a flyback circuit for zero voltage switching {ZVS} in continuous mode {CCM} and discontinuous mode {DCM}, which circuit minimized loss generated when electrifying parasitic diode of MOS transistor {MOSFET} that is secondary side switch of synchronous rectifier and which also enabled ZVS in whole range of discontinuous mode {DCM}. Particularly it contains a synchronous rectifier driver that delays the gate drive signal that is outputted from pulse width modulation part after which the driver compares it with reference voltage that is outputted from pulse width modulation part and then the driver amplifies result value so as to supply it as the drive signal for synchronous rectifier part, a level change device that drives the synchronous rectifier gate, changing the level of gate drive signal that is outputted from gate drive device, and an insulating transformer that transmits the drive signal that is outputted from synchronous rectifier driver, to the level change device side. Wherewith it inverts the output signal of the pulse width modulation part in driving the synchronous rectifier gate, resulting in minimization of loss occurred at time of electrification of parasitic diode of MOS transistor {MOSFET} that is secondary side switch so that it makes effect to enhance efficiency letting it perform zero voltage switching {ZVS} under fixed frequency condition in discontinuous mode {DCM}.

6 Claims, 8 Drawing Sheets

SYNCHRONOUS RECTIFIER FLYBACK CIRCUIT FOR ZERO VOLTAGE SWITCHING

BACKGROUND OF THE INVENTION

FIELD OF THE INVENTION

The present invention relates a flyback circuit, and particularly a synchronous rectifier flyback circuit for zero voltage switching {ZVS} in continuous mode {CCM} and discontinuous mode {DCM}, which circuit minimized loss generated when electrifying parasitic diode of MOS transistor {MOSFET} that is secondary side switch of synchronous rectifier and which also enabled ZVS in whole range of discontinuous mode {DCM}.

Recently we are under state of continual inevitable request of system specification augmentation such as multimedia system construction, acceleration of CPU to high speed, memory increase according to worldwide trend that notebook PC becomes day by day smaller, lighter, slimmer and pursuing high functionalization.

And as capacity for each resource of each system specification is increasing, though now AC adapter for notebook PC uses 4550 watts(W), gradually need is rising up for making high capacity of 60 W, 75 W, 80 W or more, for making it a micro slip easy and simple of carrying and handling, and for high efficiency.

Particularly the reason to make AC adapter in high efficiency is that higher efficiency means lower internal electricity loss, which means lower internal heat generation so that miniaturization be feasible.

Whence the most typical methods used now for AC adapter are flyback circuit method and resonance type method. Among them, flyback circuit method has disadvantage of large electricity loss because this method performs hard switching where there is large intersection of turn-on current (Ids) and turn-off voltage (Vds) of MOSFET that is semiconductor element while resonance type method is effective method for miniaturization and making its weight lighter but contains disadvantage that it has bad controllability because it makes voltage and current in sinusoidal shape and that the voltage and electric current stresses are great in switching element.

Therefore nowadays attention is led to synchronous rectification method that uses a synchronous rectifier {SR} because it has high efficiency. SR uses MOSFET instead of output diode and, although there occurs $R_{ds(on)}$ loss ($I_F^{2*} R_{ds(on)}$) when SR is electrified, $R_{ds(on)}$ is very small as much as 0.020~0.025Ω to generate only small loss so that SR is highly effective in efficiency enhancement.

Appended FIG. 1 shows an example of flyback circuit applying the existing synchronous rectifier among conventional AC adapter formations applying the synchronous rectification method as above.

As shown there, it is composed of transformer (T) inducing the primary side energy to secondary side, switch (SW) which switches primary voltage of said transformer (T), and synchronous rectifier (SR) that rectifies secondary voltage of said transformer (T).

Flyback circuit formed as above, applying the conventional SR, is operated in continuous mode {CCM} and discontinuous mode {DCM} which will be respectively explained below.

At first, in case of CCM operation, if switch (SW) gate voltage represented as 2a in FIG. 2 is controlled, primary side current (ipri) of transformer (T) increases linearly in the ON operation section of said switch (SW) as shown by 2b in FIG. 2.

Whence energy is accumulated at primary side coil (Lm) of said transformer (T) in the ON operation section of said switch (SW) and then the said transformer (T) polarity is converted at said switch (SW) turn-off time point so that electric current (isec) flows to secondary side of said transformer (T) in manner of electric current wave shape represented by 2c in appended FIG. 2. This may be known as to operate in CCM flowing in continuous manner without section where the flow is null Voltage wave shape signified by 2d in appended FIG. 2 is the said switch (SW) drain source voltage wave shape while voltage wave shape signified by 2e depicts secondary voltage of said transformer (T).

In appended FIG. 2, $T_{SR}$ is the ON section of MOSFET (SR) used as synchronous ammeter while $D_{SR}$ is electrification section of parasitic diode (D2) of said MOSFET (SR). And because the electrification section ($D_{SR}$) of said parasitic diode (D2) is also loss, efficiency will be ideally maximum without loss if $V^{SR}_{GS}$ is turned on at just $V^{SW}_{GS}$ turnoff time point and $V^{SW}_{GS}$ is turned on at just $V^{SR}_{GS}$ turnoff time point.

In other words, delay time of $T^{ON}_D$ and $T^{OFF}_D$ are needed to exist between $V^{SW}_{GS}$ turnoff and $V^{SR}_{GS}$ turnon and between $V^{SR}_{GS}$ turnoff and $V^{SW}_{GS}$ turnon respectively because $V^{SW}_{GS}$ ON section is. energy storage period in Lm and output condenser (C3) discharge will arise if $V^{SW}_{GS}$ is turned on in $V^{SR}_{GS}$ ON section.

FIG. 3 is wave shape example diagram for discontinuous mode operation case of flyback circuit such as in FIG. 2. In FIG. 3, part signified as 3a is switch (SW) gate drive voltage while 3b and 3c are primary and secondary electric currents of transformer (T) respectively. And 3d is drain source voltage of the switch (SW).

Now discontinuous mode operation case is explained below.

Because inductance is small in discontinuous mode, the energy stored in primary side (Lm) of transformer signified by reference symbol 3a in FIG. 3 during $V^{SW}_{GS}$ turnon interval is completely consumed during $V^{SW}_{GS}$ turnoff before $V^{SW}_{GS}$ is turned on, so that secondary current $I_{SEC}$ becomes "0".

Then after said secondary side current (isec) of said transformer (T) became "0", $T_{DCM}$ section from time point signified by t3 to time point signified by t4 is LC resonance section owing to sum of parasitic capacitance (C1) existing in said switch (SW) and parasitic capacitance (C2) existing in said synchronous rectifier (SR) ($C_{eq}=C^{SW}_{OSS}C^{SR}_{OSS}/n^2$) which means total capacitance and said transformer (T) leakage inductance ($L_{lk}$). This n2 TDCM section varies by input voltage and load.

SUMMARY OF THE INVENTION

Purpose of this invention to solve the technical problem is to provide synchronous rectifier flyback circuit for zero voltage switching {ZVS} in continuous mode {CCM} and discontinuous mode {DCM}, which circuit minimizes loss generated when electrifying parasitic diode of MOS transistor {MOSFET} that is secondary side switch of synchronous rectifier and which also enables ZVS in whole range of discontinuous mode {DCM}.

Feature of this invention to achieve the purpose is: in a flyback circuit including a pulse width modulation part generating the pulse width modulation signal; a switch performing the switching operation according to the pulse width modulation signal that is outputted from the pulse width modulation part; a transformer inducing primary voltage to secondary side according to switching action of the switch; and a synchronous rectifier rectifying secondary side output voltage of the transformer, the flyback circuit using said synchronous rectifier featuring that it comprises: a synchronous rectifier driver that delays the gate drive signal that is outputted from the pulse width modulation part after which the driver compares it with reference voltage that is outputted from the pulse width modulation part and then the driver amplifies result value so as to supply it as the drive signal for the synchronous rectifier part; a level change device that drives the gate of the synchronous rectifier, changing the level of gate drive signal that is outputted from the gate drive device; and an insulating transformer that transmits the drive signal that is outputted from the synchronous rectifier driver, to the level change device side.

An additional feature of this invention to achieve the purpose is that the synchronous rectifier driver comprises a signal delay device that retards gate drive signal that is outputted from the pulse width modulation part and a conversion and compensation device which compares the gate drive signal that is outputted from the signal delay device with the reference voltage that is outputted from the pulse width modulation part and then amplifies result value so as to generate the compensated gate drive signal at turnoff time of the synchronous rectification device.

Another additional feature of this invention to achieve the purpose is that an RC filter which is composed of resistance and condenser that retards the switch gate drive signal by amount of time constant, is used as the signal retardation device.

And another additional feature of this invention to achieve the purpose is that the conversion and compensation device comprises a comparator to compare the reference voltage that is outputted from said pulse width modulation part with the signal that is outputted from the signal retardation device; and a buffer amplifier to amplify output signal of the comparator so as to generate synchronous rectifier gate drive signal.

And another additional feature of this invention to achieve the purpose is that the buffer amplifier comprises first transistor that gets input of a definite positive voltage into collector terminal through first resistance and gets input of the positive voltage into base terminal through second resistance, operating on/off according to output signal of the comparator which signal is put to the base terminal; and second transistor that gets input of voltage that is put to emitter terminal of the first transistor into emitter terminal and gets input of output signal of the comparator into base terminal, operating reactively against the first transistor.

And another more additional feature of this invention to achieve said purpose is that said level change device contains third resistance connected between gate terminal of said synchronous rectifier and ground terminal, first diode of which the cathode terminal is connected to gate terminal of said synchronous rectifier device while the anode terminal is connected to ground terminal, fourth resistance between the secondary voltage output terminal of said insulation transformer and the gate terminal of said synchronous rectifier device, and second condenser connected between secondary side ground terminal of said insulation transformer and anode terminal of the first diode.

DETAILED DESCRIPTION

At first if I briefly say technical concept applied in the present invention before I explain this invention, it has been pointed out as above that the problem in conventional technique is that the secondary side current (isec) of transformer (T) operates in section other than that of prescribed operation condition because of electric loss generated by flow of the current through parasitic diode inside the synchronous rectifier (SR) and because of delay time at on/off action of synchronous rectifier (SR) so that the key of the technology is to reduce the delay time and to suppress the flow of secondary side current (isec) of transformer (T) through the parasitic diode.

Therefore I noticed that flow of secondary side current (isec) of transformer (T) through the parasitic diode of synchronous rectifier (SR) can be suppressed if the synchronous rectifier (SR) is turned on at flyback converter's inside switch (SW) turnoff timepoint and the voltage ($V^{SR}_{GS}$) between source terminal and gate terminal of synchronous rectifier is turned off simultaneously with secondary side current (isec).

Also I noticed to reduce the switching loss by way of zero voltage switching {ZVS} operation which is a soft switching.

Preferable example of this invention is explained in detail as follows.

Figure 1:
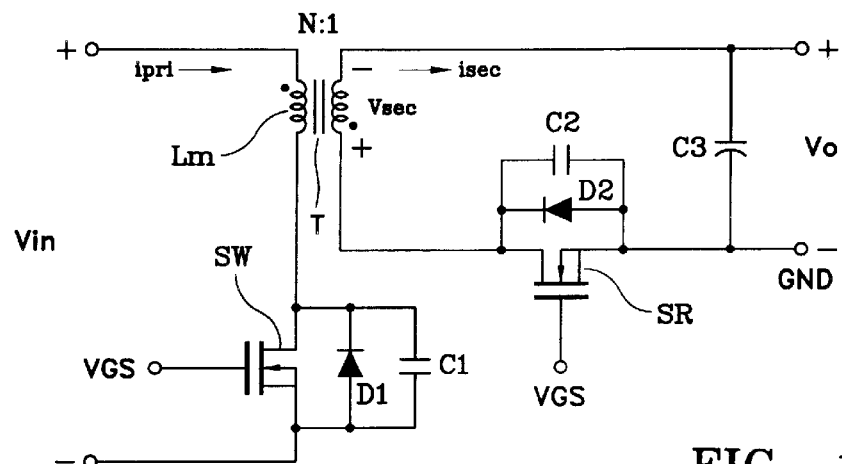
FIG. 1 is conventional flyback circuit formation diagram.
Figure 2:
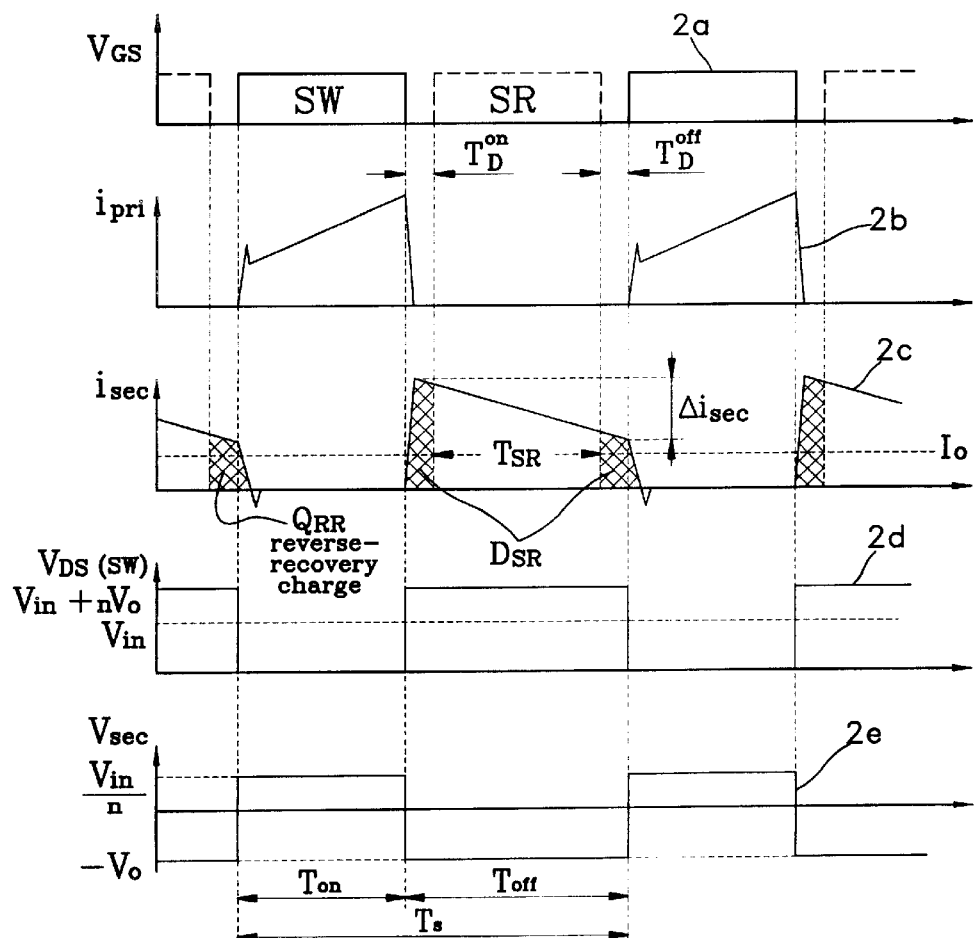
FIG. 2 is operation wave form diagram per part of circuit depicted in FIG. 1 at time of CCM mode operation.
Figure 3:
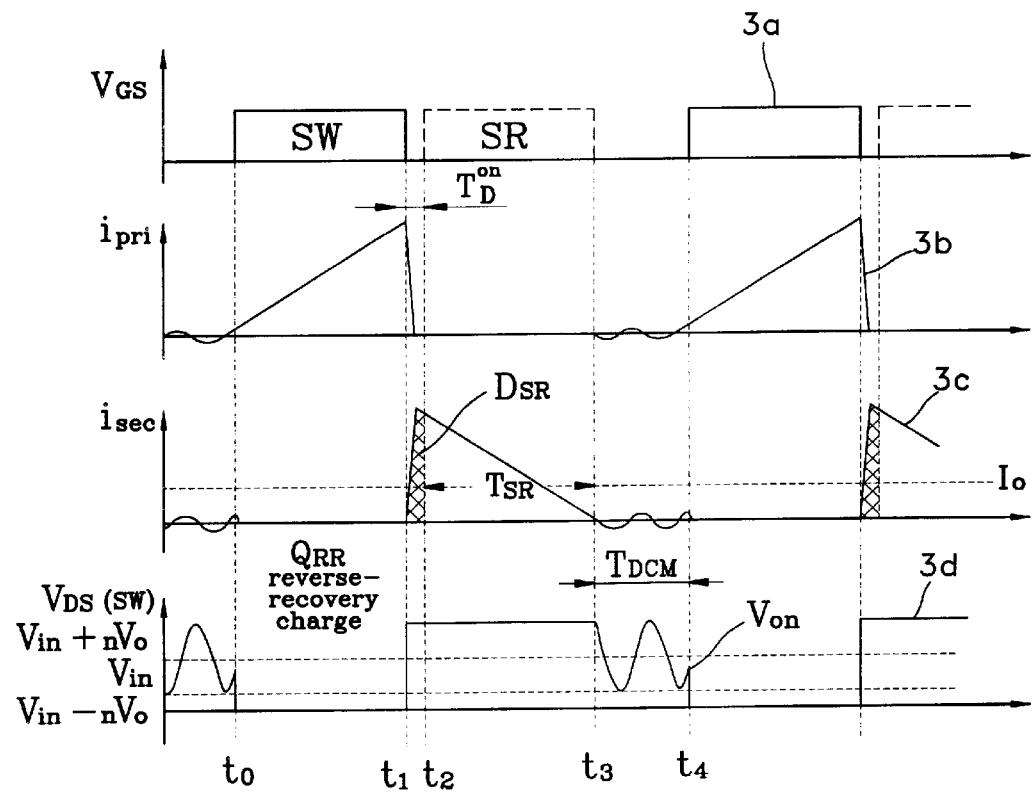
FIG. 3 is operation wave form diagram per part of circuit depicted in FIG. 1 at time of DCM mode operation.
Figure 4:
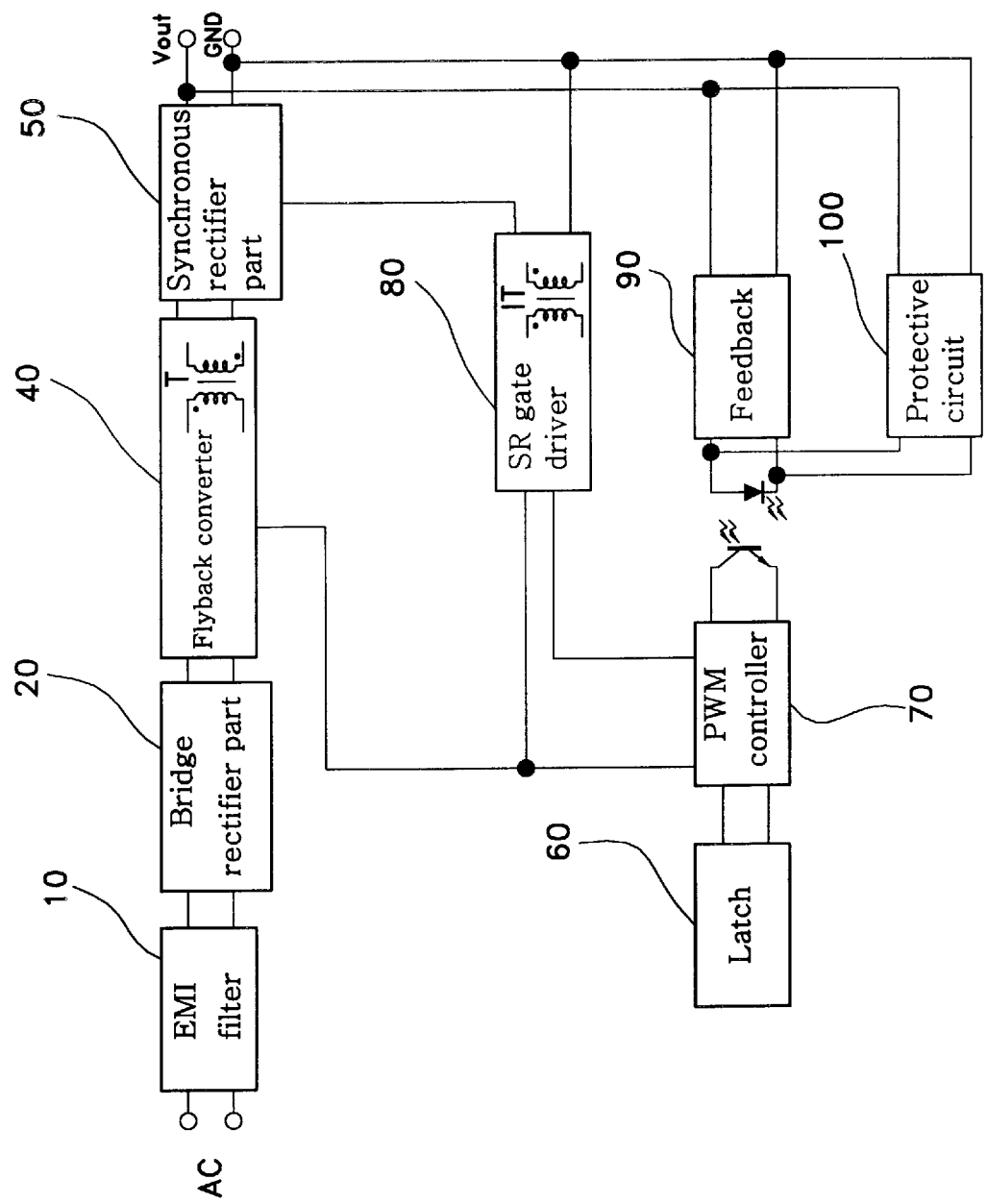
FIG. 4 is block formation example diagram of AC adapter applying the synchronous rectification method according to the present invention.

Appendix FIG. 4 is block formation example diagram of AC adapter applying the synchronous rectification method according to the present invention which adapter is largely divided into components of a EMI filter (10) that removes noise mixed in the inputted normal AC power supply and then transmits it to device side furnished at back terminal and reciprocally prevents that electric supply noise generated at said back terminal device side is transmitted to normal AC power supply input terminal side; a bridge rectifier part (20) that rectifies AC power supply inputted through the EMI filter (10) in order to convert the power into DC power; a flyback converter (40) that converts DC induced source rectified through bridge rectifier part (20) into pulse type signal according to the inputted switching control signal and then outputs the energy induced through transformer (T) furnished in inside, for the converted voltage change portion; a synchronous rectifier part (50) that rectifies the induced electric power outputted from the flyback converter (40) according to specific synchronous signal; a feedback part (90) that transmits to the front terminal the voltage status information, having detected the voltage status finally outputted through the synchronous rectifier part (50); a protective circuit (100) that prevents damage of devices situated at back terminal of the synchronous rectifier part (50) and the feedback part (90); a PWM controller (70) that gets input of signal that is feedbacked to primary side through the feedback part (90) according to the output voltage condition of the synchronous rectifier part (50) and then outputs it modulating the PWM signal for control signal; and a SR gate driver (80) to control synchronous status of the synchronous rectifier part (50) at reference voltage signal and control signal outputted from the PWM controller (70).

Figure 5:
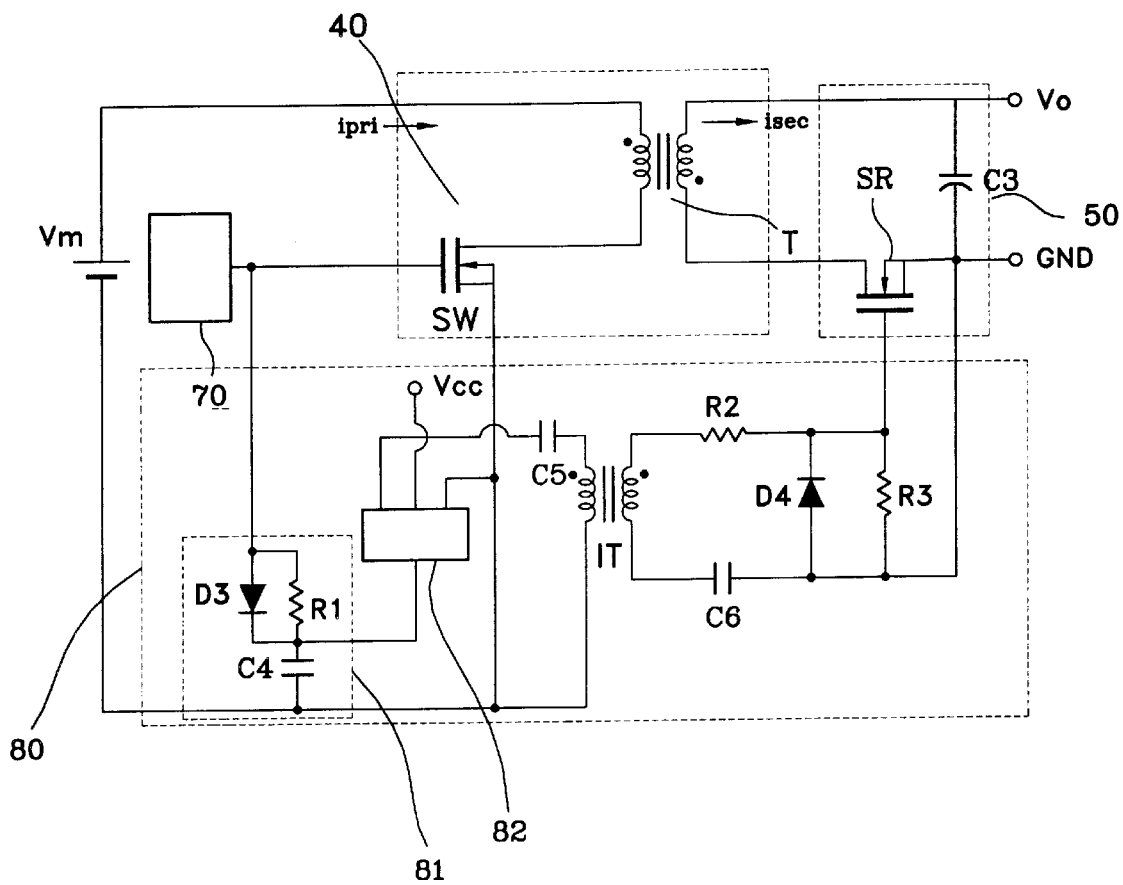
FIG. 5 is formation diagram of synchronous rectifier flyback circuit for zero voltage switching according to the present invention.

If I am to look into formation of portion related to synchronous rectification method among configuration of AC adapter applying this synchronous rectification method according to the present invention constituted as above, the appended FIG. 5 shows a layout of PWM controller (70) and circuit formation outline of flyback converter (40), synchronous rectifier part (50) and SR gate drive part (80) as of appended FIG. 4.

Appended FIG. 5 shows conformation of a PWM controller (70) generating the pulse width modulation signal; a switch (SW) that performs the switching action according to pulse width modulation signal outputted from the PWM controller (70); a transformer (T) that induces primary side voltage to secondary side according to the switching action of the switch (SW); a synchronous rectifier part (50) that rectifies secondary side output voltage of the transformer (T); and a SR gate driver (80) that retards the gate drive signal that is outputted from the PWM controller (70) after which the driver compares it with reference voltage that is outputted from the PWM controller (70) and then the driver amplifies result value so as to supply it as the drive signal for the synchronous rectifier part (50).

Whence the synchronous rectifier part (50) is composed of a third terminal connected in parallel between the transformer (T)'s secondary side voltage output terminal and ground terminal and a synchronous rectifier (SR) whose drain terminal is connected to a secondary side terminal of the transformer (T) and whose source terminal is connected to ground terminal; the SR gate driver (80) is composed of a signal delay part (81) that retards signal outputted from the PWM controller (70) and a conversion and compensation part (82) that inverts phase of signal outputted from the signal delay part (81) so as to output it as the gate drive signal of synchronous rectifier; and the signal delay part (81) is composed of resistance (R1) and condenser (C4) that retards the input signal by amount of time constant.

And the conversion and compensation part (82) shows the case when it comprises IC in one chip; but in another conformation there are furnished insulating transformer (IT) that drives the gate of synchronous rectifier (SR) furnished in the synchronous rectifier part (50), using the signal outputted from the conversion and compensation part (82), third resistance (R3) connected between ground terminal and gate terminal of the synchronous rectifier (SR), fourth diode (D4) of which the cathode terminal is connected to gate terminal of the synchronous rectifier (SR) while the anode terminal is connected to ground terminal, second resistance (R2) between the secondary voltage output terminal of the insulating transformer (IT) and the gate terminal of the synchronous rectifier (SR), and sixth condenser (C6) connected between the other terminal of secondary side of the insulating transformer (IT) and the anode terminal of the fourth diode (D4).

Figure 6:
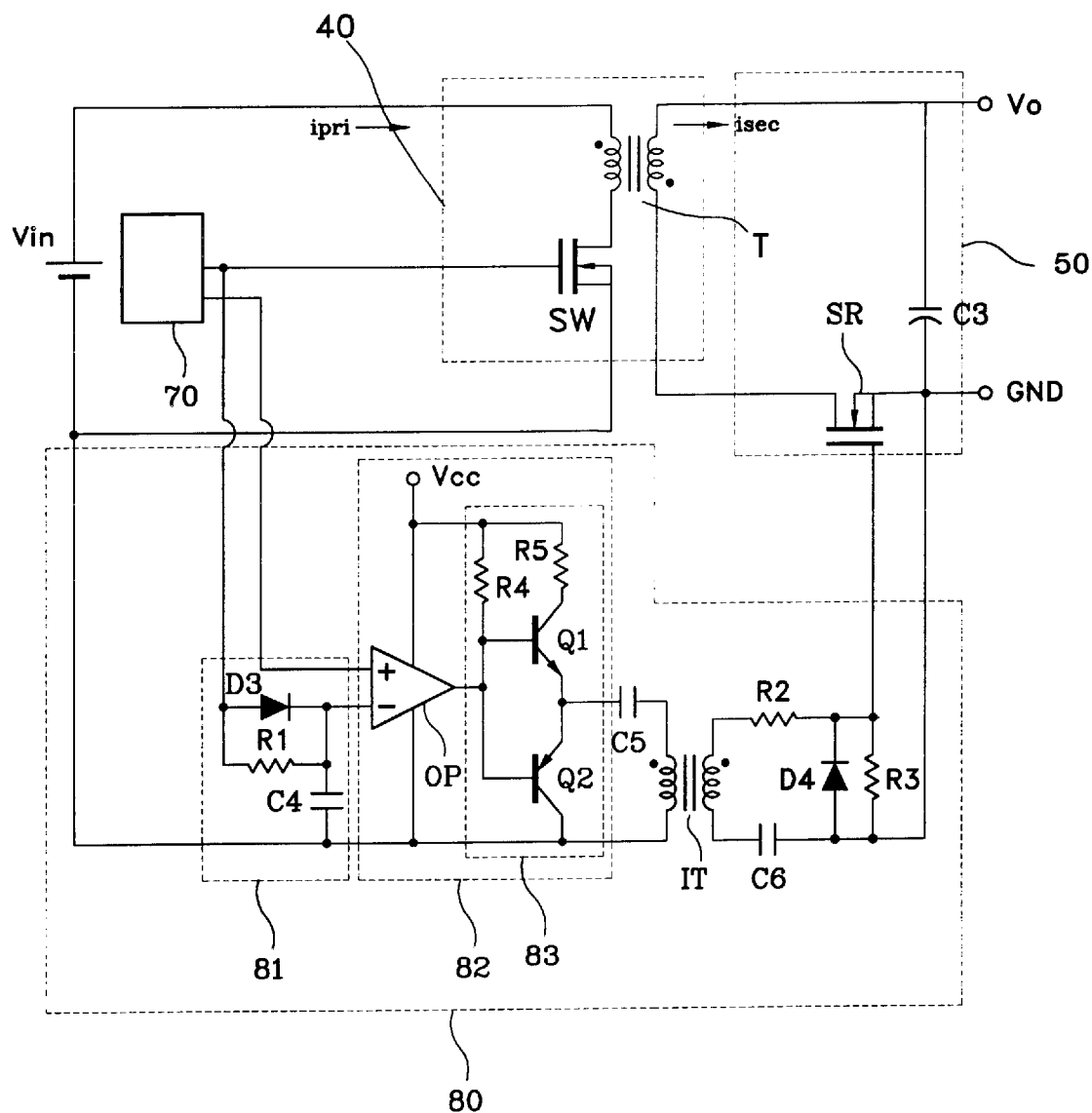
FIG. 6 is detail formation diagram of synchronous rectifier flyback circuit for zero voltage switching according to the present invention.

Namely conversion and compensation part (82) in FIG. 5 example constituted as above comprises single chip; but if the part is to be formed using elements, owing to the matter of unit price of production, it will be as in appended FIG. 6.

Appendix FIG. 6 is formation diagram of synchronous rectifier flyback circuit for zero voltage switching according to the present invention.

If I look into formation of the delay compensation part (82) which is different part in comparison to FIG. 5 formation among FIG. 6 formation, the part is composed of a comparator (OP) that compares reference voltage (Vref) outputted from the PWM controller (70) against signal outputted from the signal delay part (81) and a buffer amplifier (83) that amplifies output signal of the comparator (OP) and generates synchronous rectifier gate drive signal that is compensated for delay.

And the buffer amplifier (83) is composed of first transistor (Q1) that gets input of a definite positive voltage (Vcc) into collector terminal through fifth resistance (P5) and gets input of the positive voltage (Vcc) into base terminal through fourth resistance (R4), operating on/off according to output signal of the comparator (OP) which signal is put to the base terminal, and second transistor (Q2) that gets input of voltage that is put to emitter terminal of the first transistor (Q1) into input terminal and gets input of output signal of the comparator (OP) into base terminal, operating reactively against the first transistor (Q1).

If I look into flyback circuit operation according to the present invention constituted as above, with reference to appended FIG. 6, reference voltage (Vref) and gate drive signal to drive the switch gate are generated at PWM controller whereas switch (SW) gate is driven by the gate drive signal And transformer (T) induces the primary side energy to secondary side according to switching action of the switch (SW) while synchronous rectifier (SR) outputs rectifying the secondary side output voltage of the transformer (T).

I directly used output signal of the PWM controller (70) to minimize parasitic diode loss after turning off voltage ($V^{SR}_{GS}$) between source terminal and gate terminal of synchronous rectifier; and the present invention retards switch gate drive signal outputted from the PWM controller (70) in signal delay part (81) by amount of time constant of resistance (R1) and fourth condenser (C4) in order to prevent simultaneous electrification of MOS transistor that is primary side main switch and synchronous rectifier that is secondary side switch so as to give delay time T that there would be no overlap section of $V^{SW}_{GS}$ turnoff section and $V^{SR}_{GS}$ turnon section.

And comparator (OP) in conversion and compensation part (82) gets input of signal obtained from the signal delay part (81) into converted data input terminal and gets input of reference voltage (Vref) outputted from the PWM controller (70) into nonconverted data input terminal so as to compare magnitudes and then to output the voltage signal according to comparison value into manner of high or low state voltage signal.

And comparator (OP) output is amplified at buffer amplifier (83) to be outputted as synchronous rectifier (SR) gate drive signal. Whence signal amplified at buffer amplifier (83) maintains phase inverted status against signal outputted from the comparator (OP) and the amplified status.

This amplified gate drive signal output passes insulating transformer (IT), after then it experiences division of voltage by resistance (R2, R3), and then it drives gate of the synchronous rectifier (SR).

Figure 7:
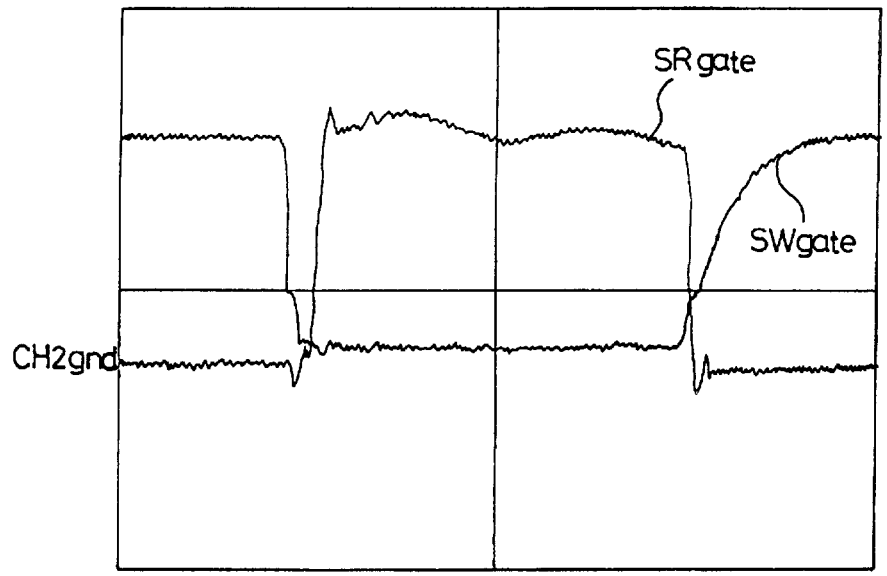
FIG. 7 is wave form diagrams of synchronous rectifier gate voltage and switch gate voltage when synchronous rectifier flyback circuit in FIG. 6 operated in CCM mode.
Figure 8:
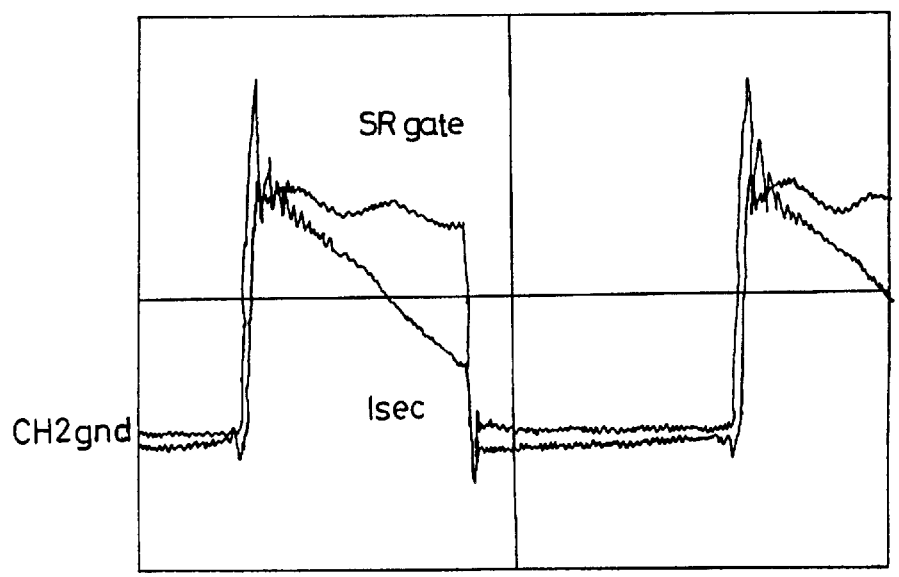
FIG. 8 is wave form diagrams of synchronous rectifier gate voltage and secondary electric current of transformer when synchronous rectifier flyback circuit in FIG. 6 operated in CCM modes.

In the description, in case of CCM operation, loss through parasitic diode of synchronous rectifier (SR) has been reduced because $V^{SR}_{GS}$ is turned on after delay of TOND since $V^{SW}_{GS}$ turnoff (Cf. appended FIG. 7), and so loss does not arise because electric current flow does not occur through parasitic diode of synchronous rectifier (SR) as $V^{SR}_{GS}$ is turned off simultaneously with transformer (T)'s secondary current (isec) turnoff (Cf. appended FIG. 8).

And at time of DCM operation, isec goes to be a minus value as synchronous rectifier (SR) maintains on after transformer (T)'s secondary current isec became zero (Cf. Appended FIG. 9), and transformer (T)'s primary side current ipri after synchronous rectifier (SR) turnoff increases linearly from such a minus value before $V^{SW}_{GS}$ turnon in contrast to existing flybacks where it increases from zero value (Cf. appended FIG. 11).

And $V^{SW}_{GS}$ of MOS transistor that is primary side switch element drops to zero and transformer (T)'s primary side current ipri starts to increase from a minus value so that intersection of voltage and electric current does not occur that there be no switching loss. Namely, zero voltage switching is accomplished because it is turned on at time of zero voltage.

And zero voltage switching {ZVS} has been operated in only variable frequency mode in synchronous rectifier flyback circuit until now but ZVS becomes feasible in fixed frequency also. And CCM type operation is feasible at time of low voltage input and at maximum load condition while ZVS operation in DCM type is feasible in cases either at low voltage input state and light load condition or at high voltage input state and all range of load conditions.

Appended FIG. 7 shows synchronous rectifier gate voltage and switch gate voltage wave shapes of synchronous rectifier flyback circuit according to the present invention for CCM case and FIG. 8 shows synchronous rectifier gate voltage and secondary current wave shapes.

Figure 9:
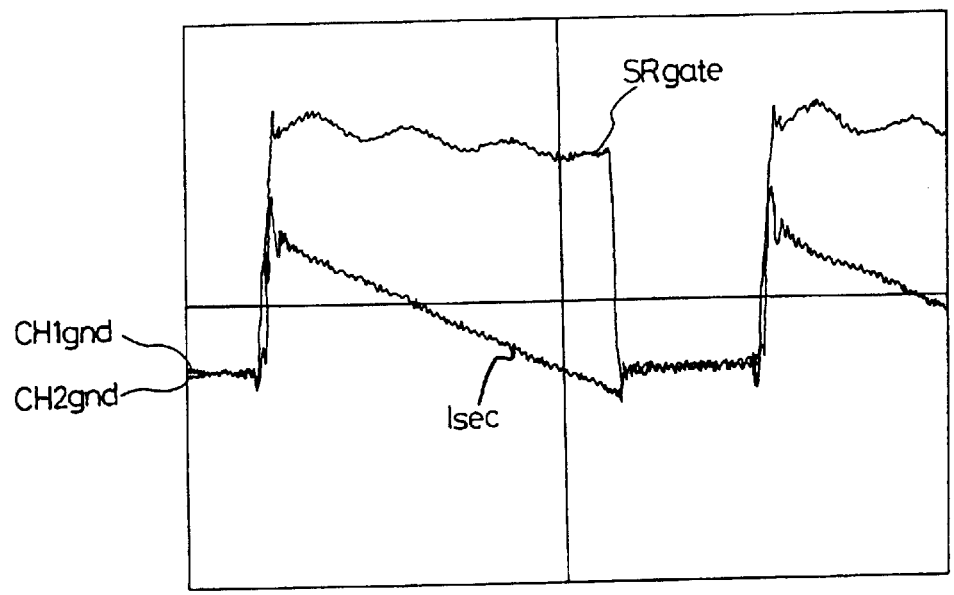
FIG. 9 is wave form diagrams of synchronous rectifier gate voltage and secondary electric current of transformer when synchronous rectifier flyback circuit in FIG. 6 operated in DCM mode.
Figure 10:
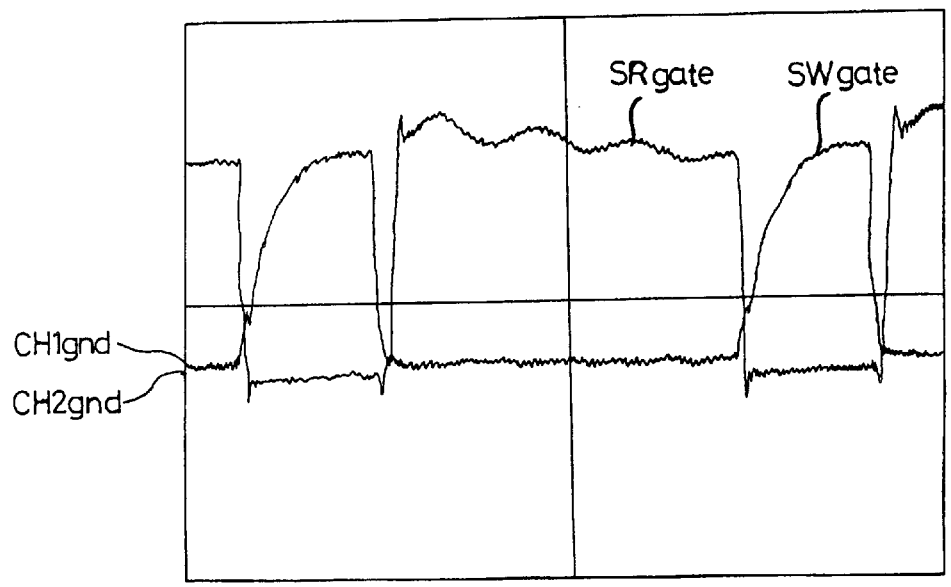
FIG. 10 is wave form diagrams of synchronous gate voltage and switch gate voltage when synchronous rectifier flyback circuit in FIG. 6 operated in DCM mode.
Figure 11:
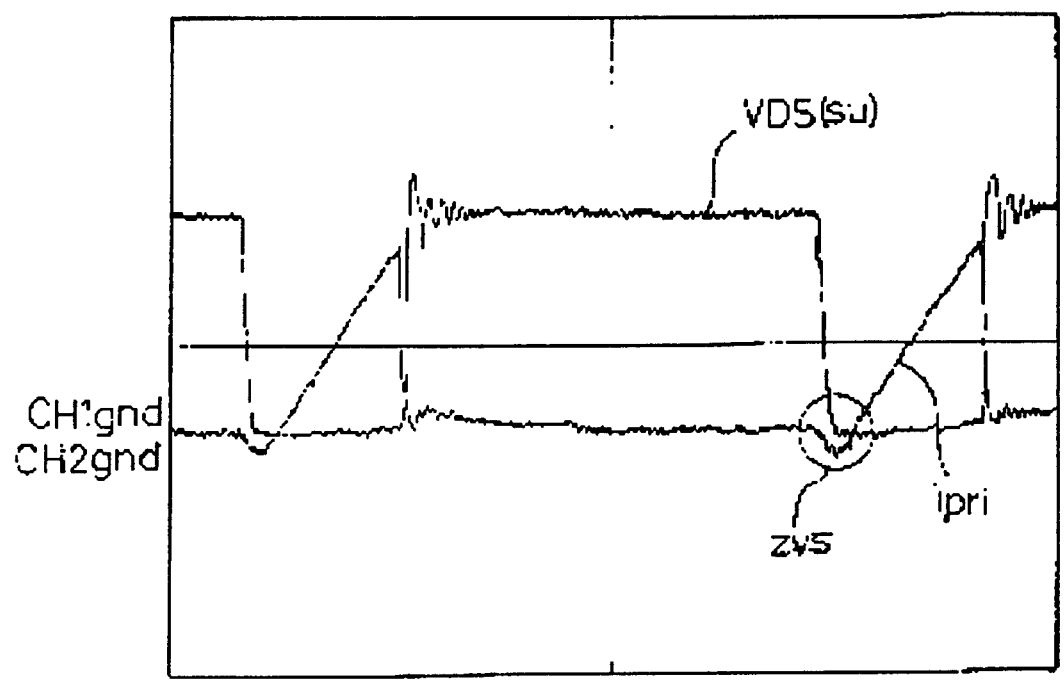
FIG. 11 is wave form diagrams of switch voltage and primary electric current of transformer when synchronous rectifier flyback circuit in FIG. 6 operated in DCM mode.

And appended FIG. 9 is wave form diagram of synchronous rectifier gate voltage and secondary electric current of transformer in case when synchronous rectifier flyback circuit of FIG. 6 acted in DCM; FIG. 10 is synchronous gate voltage and switch gate voltage wave form diagrams in case when synchronous rectifier flyback circuit of FIG. 6 acted in DCM; and FIG. 11 is wave form diagram of switch voltage and primary electric current of transformer in case when synchronous rectifier flyback circuit of FIG. 6 acted in DCM.

As described above in detail, the present invention uses pulse width modulation part output, using a gate driver, thereby inverting the output signal of the pulse width modulation part in driving the synchronous rectifier gate, resulting in minimization of loss occurred at time of electrification of parasitic diode of MOS transistor {MOSFET} that is secondary side switch so that it makes effect to enhance efficiency letting it perform zero voltage switching {ZVS} under fixed frequency condition in discontinuous mode {DCM}.

What is claimed is:

1. In a flyback circuit including a pulse width modulation part generating the pulse width modulation signal; a switch performing the switching operation according to the pulse width modulation signal that is outputted from said pulse width modulation part; a transformer inducing primary voltage to secondary side according to switching action of said switch; and a synchronous rectifier rectifying secondary side output voltage of said transformer, said flyback circuit using said synchronous rectifier featuring that it comprises:
a synchronous rectifier driver that delays the gate drive signal that is outputted from said pulse width modulation part after which the driver compares it with reference voltage that is outputted from said pulse width modulation part and then the driver amplifies result value so as to supply it as the drive signal for said synchronous rectifier part;
a level change device that drives the gate of said synchronous rectifier, changing the level of gate drive signal that is outputted from said gate drive device; and
an insulating transformer that transmits the drive signal that is outputted from said synchronous rectifier driver, to said level change device side.

2. The flyback circuit in claim 1, wherein said synchronous rectifier driver comprises a signal delay device that retards the gate drive signal that is outputted from said pulse width modulation part; and a conversion and compensation device which compares the gate drive signal that is outputted from said signal delay device with the reference voltage that is outputted from said pulse width modulation part and then amplifies the result value so as to generate the compensated gate drive signal at turnoff time of said synchronous rectification device.

3. The flyback circuit in claim 2, wherein an RC filter which is composed of a resistance and a condenser that retards said switch gate drive signal by amount of time constant, is used as said signal retardation device.

4. The flyback circuit in claim 2, wherein said conversion and compensation device comprises a comparator to compare the reference voltage that is outputted from said pulse width modulation part with the signal that is outputted from said signal retardation device; and a buffer amplifier to amplify output signal of said comparator so as to generate synchronous rectifier gate drive signal.

5. The flyback circuit in claim 4, said buffer amplifier comprises a first transistor that gets input of a definite positive voltage into a collector terminal through a first resistance and gets input of said positive voltage into a base terminal through a second resistance, operating on/off according to the output signal of said comparator which signal is put to said base terminal; and a second transistor that gets input of voltage that is put into an emitter terminal of said first transistor into the emitter terminal and gets input of the output signal of said comparator into the base terminal, operating reactively against said first transistor.

6. The flyback circuit in claim 1, wherein said level change device comprises a third resistance connected between a gate terminal of said synchronous rectifier and a ground terminal; a first diode of which its cathode terminal is connected to said gate terminal of said synchronous rectifier device while its anode terminal is connected to said ground terminal; a fourth resistance between a secondary voltage output terminal of said insulation transformer and said gate terminal of said synchronous rectifier device; and a second condenser connected between a secondary side ground terminal of said insulation transformer and said anode terminal of said first diode.

* * * * *